United States Patent

[11] 3,613,506

| [72] | Inventor | Oswald O. Kytta<br>South Bend, Ind. |
|---|---|---|
| [21] | Appl. No. | 842,585 |
| [22] | Filed | July 17, 1969 |
| [45] | Patented | Oct. 19, 1971 |
| [73] | Assignee | The Bendix Corporation |

[54] SERVOMOTOR HAVING IMPROVED NO-POWER OPERATION
7 Claims, 2 Drawing Figs.

| [52] | U.S. Cl. | 91/369, 91/376, 91/391, 92/48, 92/94 |
|---|---|---|
| [51] | Int. Cl. | F15b 9/10, F15b 13/10, F01b 19/00 |
| [50] | Field of Search | 92/48, 49; 91/369, 369 A, 369 B, 376, 391 |

[56] References Cited
UNITED STATES PATENTS

| 2,989,035 | 6/1961 | Stelzer | 92/48 |
| 3,096,689 | 7/1963 | Kytta | 92/48 |

*Primary Examiner*—Paul E. Maslousky
*Attorneys*—C. F. Arens and Plante, Arens, Hartz, Hix and Smith ABSTRACT: A servomotor having first and second diaphragm members joined together to form a movable wall. The first diaphragm member is attached to the periphery of the housing of the servomotor and the second diaphragm member is retained by a hub member. The hub member contains a control valve for selectively communicating fluid pressure to one side of the first and second diaphragm members while vacuum is present on the other side in response to an input. When this pressure differential is sufficient to overcome a resilient force acting on the first diaphragm member, a corresponding force is transmitted to the hub member. If the pressure differential is insufficient to overcome the resilient force, the second diaphragm member will expand as the hub member is moved by an input to pressurize a master cylinder while the first diaphragm member remains stationary.

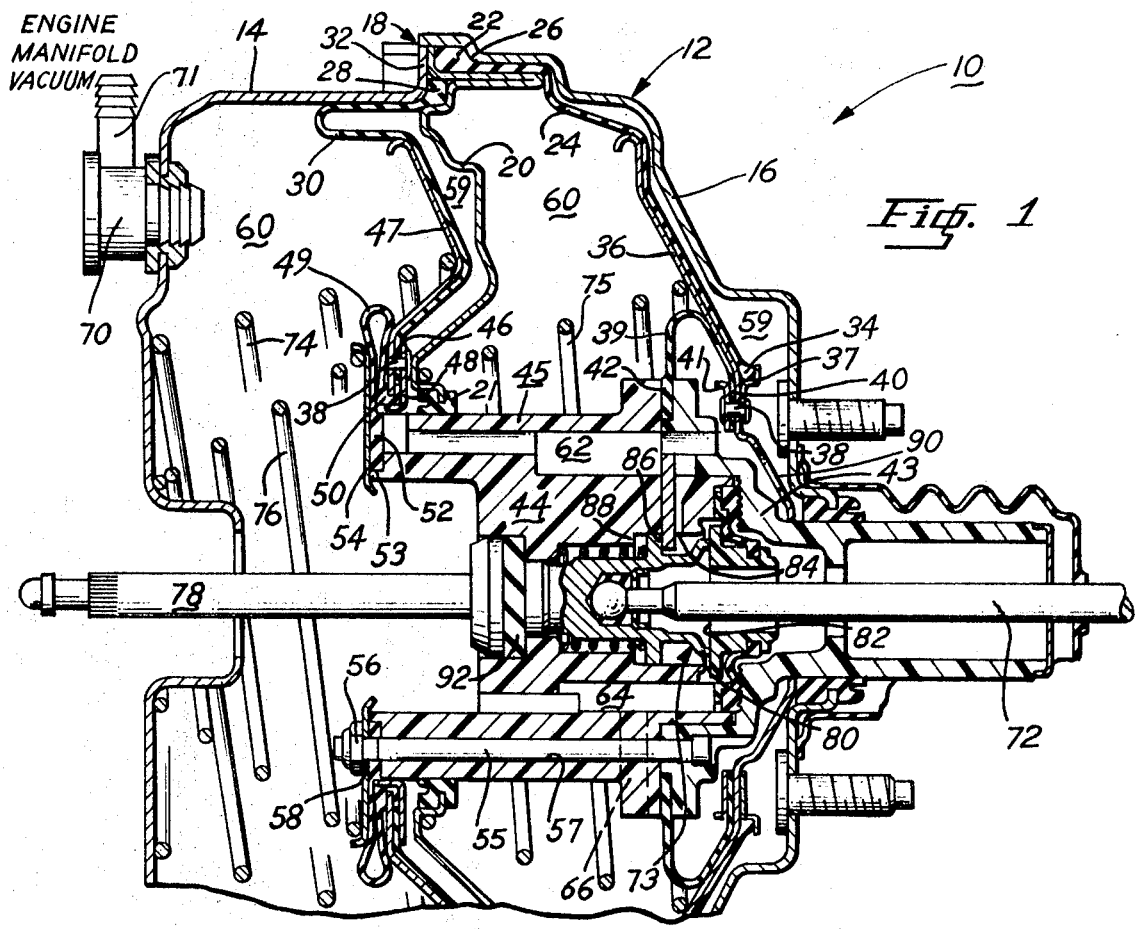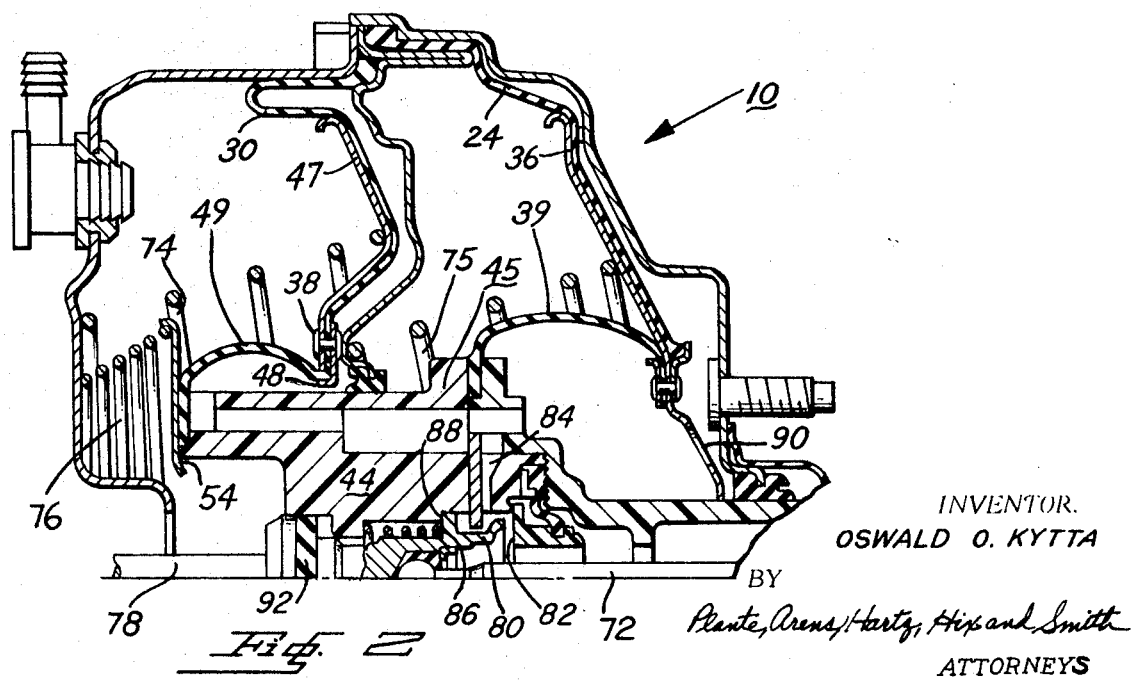

3,613,506

SERVOMOTOR HAVING IMPROVED NO-POWER OPERATION

SUMMARY OF THE INVENTION

This invention is primarily concerned with the improvement of fluid pressure servomotors for use in association with power braking systems employed in automotive vehicles. More particularly, the invention concerns a concept designed to minimize the effort required by the operator of the vehicle to actuate the servomotor in the absence of power assist.

It is an object of this invention to provide a servomotor that has improved ease of operation in the absence of power assist.

It is an object of this invention to provide a servomotor having structural improvements in the design of the movable wall means to facilitate reduced pedal effort by the vehicle operator during no-power braking.

It is an object of this invention to provide a servomotor that has an expandable diaphragm means between the hub and the remainder of the movable wall to allow reduced reaction forces and friction during no-power operation.

Other objects and features of the invention will be apparent from the following description of the servomotor taken in connection with the accompanying drawings.

BRIEF DESCRIPTION OF THE DRAWINGS

FIG. 1 is a sectional view of a fluid pressure servomotor incorporating the elements of this invention; and FIG. 2 is a fragmented sectional view of the movable wall means, shown in FIG. 1, which depicts operation in the absence of power assist.

DETAILED DESCRIPTION OF THE INVENTION

With reference now to FIG. 1, there is shown a fluid pressure servomotor 10 having a housing 12 comprised of a forward shell 14 and a rearward shell 16 joined as at 18 by a bayonet-type twist lock arrangement, such as is more fully described in U.S. Pat. No. 3,083,698, assigned to the common assignee of this patent. It is noted that before joining the shells, the internal components of the servomotor 10 are assembled, since the joining of the shells renders the components inaccessible. A partition means or center plate 20, including an annular bearing seal 21, is sandwiched between said shells 14 and 16 so as to be positively engaged thereby. The partition means 20 thus compresses an outer bead 22 of a diaphragm 24 against flange 26 of the rearward shell 16, and an outer bead 28 of a diaphragm 30 against flange 32 of the forward shell 14, to insure a fluidtight seal therebetween. The diaphragm 24 has an inner bead 34 which is sealingly held between a diaphragm-reinforcing plate 36 and an annular plate 37 by means of rivets 38. An auxiliary diaphragm 39 has on one end a bead or portion 40 which is likewise sealingly held between the diaphragm-reinforcing plate 36 and an annular plate 41 by means of the rivets 38. The diaphragm 39 has on its other end a bead 42 which is compressed between portions 43 and 44 of the hub 45 to establish a fluid seal therebetween. The diaphragm 30 has an inner bead 46 which is sealingly held between a diaphragm-reinforcing plate 47 and an annular plate 48 by means of rivets 38. An auxiliary diaphragm 49 has on one end a bead or portion 50 which is likewise sealingly held between the diaphragm-reinforcing plate 47 and the annular plate 48 by means of the rivets 38. The diaphragm 49 has on its other end a bead 52 which is compressed into a groove 53 of the hub 45 by a diaphragm support plate 54 to provide for a fluid seal at that point. As may be seen in FIG. 1, the portions 43 and 44 of the hub 45, the diaphragms 39 and 49 and the diaphragm support plate 54 are sealingly fastened together by bolts 55 and nuts 56 suitably installed in bores 57 of the hub 45 and passing through openings 58 of the diaphragm support plate 54.

The hub 45 and the partition means 20 along with the diaphragm assembly aforementioned are preassembled such that the hub 45 is carried by the annular bearing seal 21 to allow for sliding motion between the hub 45 and partition means 20. Further, the hub 45, the diaphragms 24 and 30, the diaphragm-reinforcing plates 36 and 47, and diaphragms 39 and 49 comprise a movable wall means which defines first and second variable volume chambers 59 and 60, each including at least two portions, as may be seen clearly from the drawing. The first and second variable volume chambers 59 and 60 are divided into two sets of opposed variable volume chambers by the partition means 20, with each set of opposed variable volume chambers being comprised of portions of the chambers 59 and 60. It is noted that the chambers 59 and 60, formed by the movable wall means, are normally evacuated when the servomotor 10 is in the brake released position, i.e., the movable wall means is normally vacuum suspended within the servomotor 10. The hub 45 has inwardly from its outermost periphery a passage means or plurality of axial conduits 62 to allow communication of one portion of chamber 59 with its other portion. Further, the hub 45 has located inwardly from conduits 62 a passage means or plurality of axial conduits 64 which include radial extensions 66 to allow communication of one portion of chamber 60 with its other portion.

Regarding the operation of the servomotor 10, chamber 60 is in communication through a check valve 70 and a conduit 71 with the engine manifold vacuum, not shown. A push rod 72 is operably connected to a brake pedal, not shown, to control a valve means 73 to admit atmospheric air into chamber 59 thereby developing a pressure differential across the movable wall means comprised of diaphragms 24 and 30, diaphragm-reinforcing plates 36 and 47, diaphragm support plate 54, and the hub 45. More specifically, it can be seen in FIG. 1 that diaphragm-reinforcing plates 36 and 47 and diaphragm support plate 54 of the movable wall means are normally biased to the right by resilient means or return springs 74, 75 and 76, respectively. Thus it may be seen that under normal power operation all three springs 74, 75 and 76 exert a force which opposes movement of the movable wall means. However, when a sufficient pressure differential is developed across the movable wall means, the pressure differential will cause the movable wall means to move to the left. This movement of the movable wall means causes shaft 78 to actuate a master cylinder and braking system, not shown.

With reference now to FIG. 2, the hub 45 is shown in its applied position in the absence of power assist normally developed by a pressure differential across the movable wall means.

An operator, upon initially moving push rod 72 will unseat poppet 80 from chamber 82. With poppet 80 unseated, atmospheric pressure is communicated through passageway 84 to conduit 62 connected to variable volume chamber 59. In the absence of vacuum being communicated to variable volume chamber 60, a pressure differential does not exist across the diaphragm members 24 and 30. Further movement of the push rod will seat force-transmitting projection 86 against internal shoulder 88 of the hub member 44. Without the pressure differential across the diaphragm members 24 and 30, the operator must supply the total energizing force for pressurizing the fluid in the master cylinder (not shown). This energizing force applied to the push rod 72 by the operator is transmitted through the reaction disc 92 to the push rod 78 attached to the piston for pressurizing the fluid of the master cylinder. After the force-transmitting projection 86 abuts the shoulder of the hub 44, any movement of the push rod 72 to the left, as viewed in FIG. 1, will correspondingly occur in the hub. The expendable auxiliary diaphragms 39 and 49 will allow the hub alone to move without the remainder of the movable wall means. Hole 90 in the diaphragm-reinforcing plate 36 and passages on either side of the head of rivets 38 of reinforcing plate 48 permit atmospheric pressure free access to the variable volume chambers 59 to eliminate any drag upon movement of the hub to the full activation position, shown in FIG. 2. Thus, it can be seen that the only force opposing the movement of push rod 72 from the rest position is the hub return spring 76 providing a substantial reduction in the foot pedal effort needed to manually activate the braking system.

For a more extensive description of the operation of portions of the fluid pressure servomotor, hereinabove disclosed, reference is made to copending U.S. application Ser. No. 732,938 now U.S. Pat. No. 3,517,588 having the same assignee and incorporated herein by reference.

While the specific details have been herein shown and described, the invention is not confined thereto, as other substitutions can be made within the spirit and scope of the invention.

I claim:

1. A fluid pressure servomotor, comprising:
   a housing:
   movable wall means operatively arranged in said housing defining first and second variable volume chambers, said movable wall means including:
   a hub,
   first diaphragm means operatively connected to said housing; and
   second diaphragm means operatively connecting said first diaphragm means to said hub, said second diaphragm means being expandable to facilitate axial movement of said hub relative to said first diaphragm means in the absence of a pressure differential across said first diaphragm means;
   valve means carried in said hub;
   operator-operated means for actuating said valve means, said valve means being operatively connected to said variable volume chambers to control a pressure differential across said first diaphragm means to cause said movable wall means to move in response to actuation of said operator-operated means; and
   force transmitting means responsive to said movable wall means.

2. A fluid pressure servomotor, as recited in claim 1, further including resilient means interposed between said housing and said movable wall means.

3. A fluid pressure servomotor, as recited in claim 2, wherein said resilient means comprises:
   First spring means interposed between said housing and said first diaphragm means; and
   second spring means interposed between said housing and said hub.

4. A servomotor having a housing and a wall member dividing the interior of the housing of the servomotor in a plurality of variable volume pressure chambers separated by first diaphragm means connected to the periphery of the housing and a second diaphragm means, said second diaphragm means is connected to a hub member, said hub member containing a valve for selectively controlling fluid flow to create a pressure differential between said chambers causing the hub member to move and transmit a force, said servomotor having means for permitting said hub member to move axially in response to an input independently of said wall member, said means comprising:
   first resilient means for urging said first diaphragm means toward a rest position;
   second resilient means urging said hub member toward said rest position; and
   said second diaphragm means allowing a pressure differential between said variable volume chambers sufficient to overcome said first and second resilient means to move said first diaphragm means away from said rest position and transmit a moving force to the hub and for permitting said hub member alone to move by overcoming said second resilient means when said pressure differential is insufficient to move said first diaphragm means, said second diaphragm means expanding axially to correspond to movement of said hub member in response to an input while said first diaphragm means remains in the rest position.

5. In the servomotor, as recited in claim 4 further including:
   a plate member attached to said hub for sealingly retaining said second diaphragm means against said hub and for providing a surface upon which said second resilient means acts to urge said hub to said rest position.

6. In the servomotor, as recited in claim 5, further including:
   reinforcing means located adjacent said first diaphragm means, said reinforcing means contacting said plate member to move said hub in response to a sufficient pressure differential.

7. In the servomotor, as recited in claim 6, further including:
   an annular plate loosely surrounding said hub, said first and second diaphragm means being located between said annular plate and said reinforcing means; and
   fastening means for joining said annular plate and said reinforcing means to assure a seal between said variable volume chamber.